United States Patent
Saisho

(10) Patent No.: US 10,110,763 B2
(45) Date of Patent: Oct. 23, 2018

(54) SYSTEM, IMAGE FORMING APPARATUS, AND NETWORK CAMERA APPARATUS

(71) Applicant: CANON KABUSHIKI KAISHA, Tokyo (JP)

(72) Inventor: Kazuya Saisho, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 329 days.

(21) Appl. No.: 14/622,635

(22) Filed: Feb. 13, 2015

(65) Prior Publication Data

US 2015/0237227 A1 Aug. 20, 2015

(30) Foreign Application Priority Data

Feb. 18, 2014 (JP) .................................. 2014-028394

(51) Int. Cl.
| | |
|---|---|
| *H04N 1/00* | (2006.01) |
| *H04N 5/00* | (2011.01) |
| *G06K 15/00* | (2006.01) |
| *H04N 5/232* | (2006.01) |

(52) U.S. Cl.
CPC ..... *H04N 1/00875* (2013.01); *G06K 15/4095* (2013.01); *H04N 5/23206* (2013.01); *H04N 5/23219* (2013.01); *H04N 5/23241* (2013.01); *H04N 5/23245* (2013.01); *H04N 2201/0094* (2013.01)

(58) Field of Classification Search
CPC ... H04N 1/00; H04N 7/18; B41J 29/38; G07F 17/3206
See application file for complete search history.

(56) References Cited

U.S. PATENT DOCUMENTS 9,813,604 B2 * 11/2017 Matsuda .................. H04N 5/76
2014/0129487 A1 * 5/2014 Adachi ............... G07F 17/3206
706/11

FOREIGN PATENT DOCUMENTS

JP 2013021405 A 1/2013

* cited by examiner

*Primary Examiner* — Sathyanaraya V Perungavoor
*Assistant Examiner* — Patricia I Young
(74) *Attorney, Agent, or Firm* — Canon U.S.A., Inc. IP Division

(57) ABSTRACT

A system includes an image forming apparatus and a network camera apparatus that communicates with the image forming apparatus. The image forming apparatus includes a detection unit configured to detect a user of the image forming apparatus and a transmission unit that, in a case where the detection unit detects the user, transmits an imaging request to the network camera apparatus. The network camera apparatus includes an imaging unit, a receiving unit that receives the imaging request transmitted from the image forming apparatus, and a control unit that, in a case where the receiving unit receives the imaging request, controls the imaging unit to image a vicinity of the image forming apparatus which has transmitted the imaging request.

12 Claims, 12 Drawing Sheets

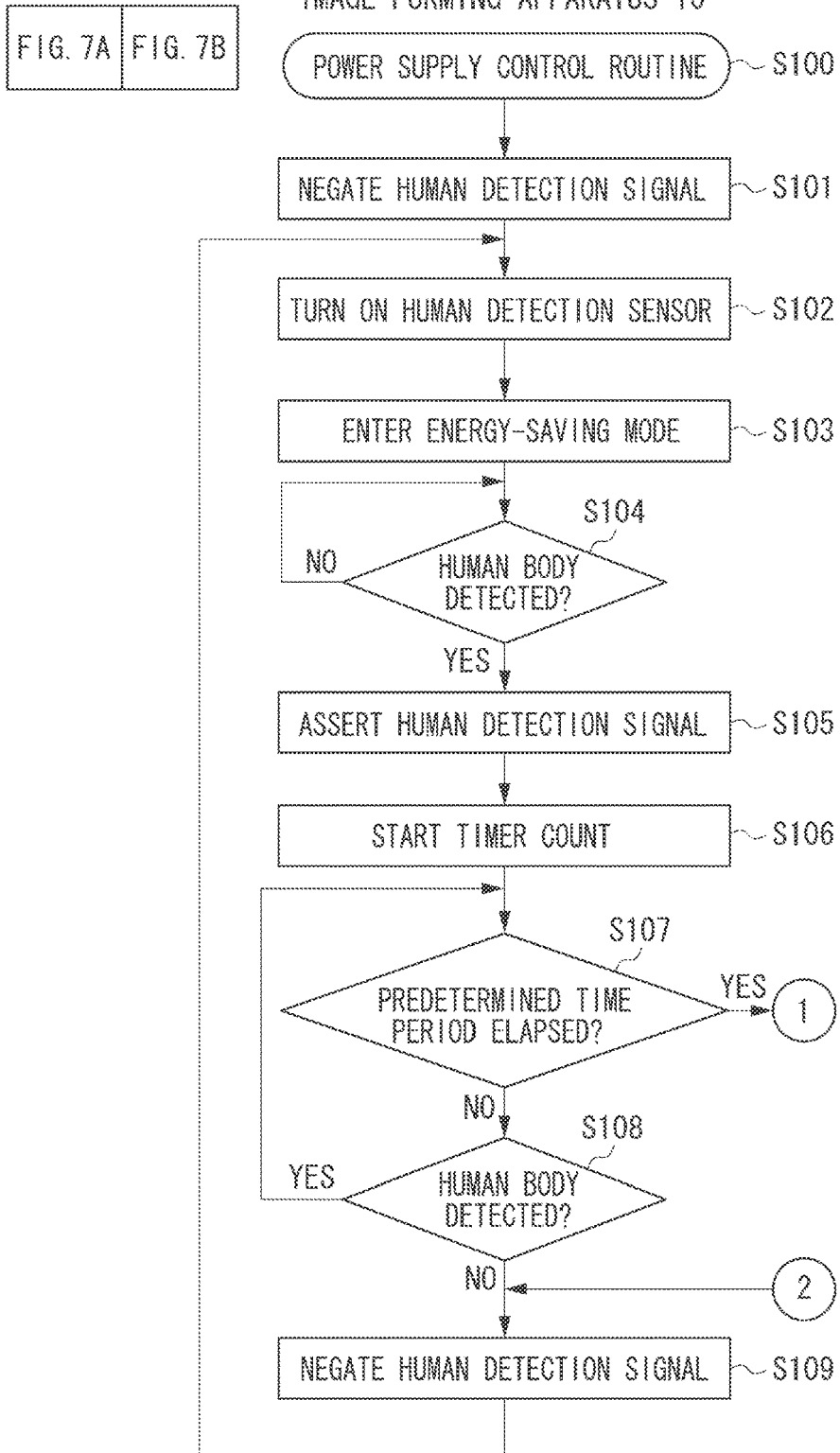

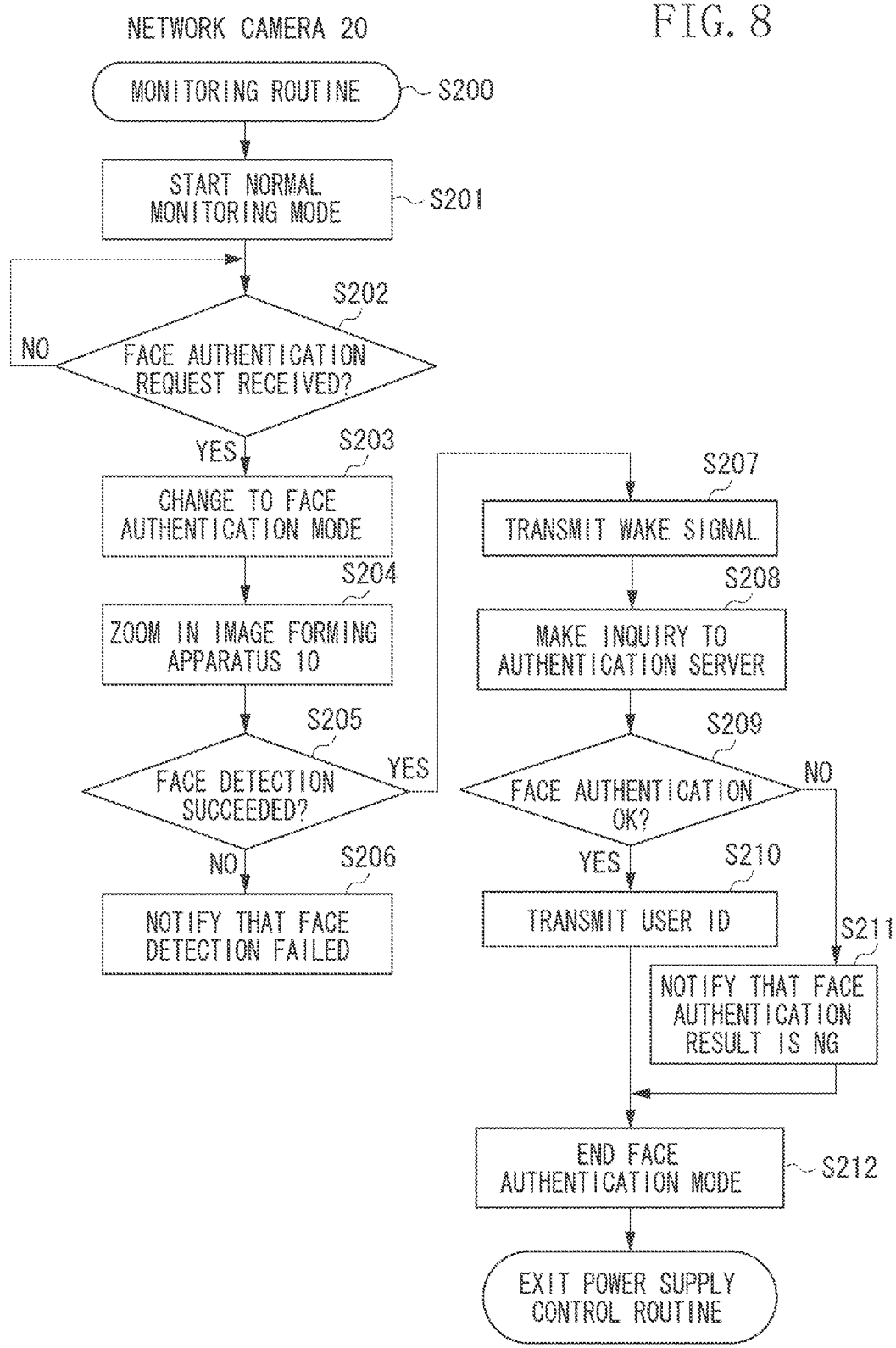

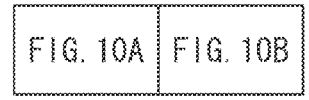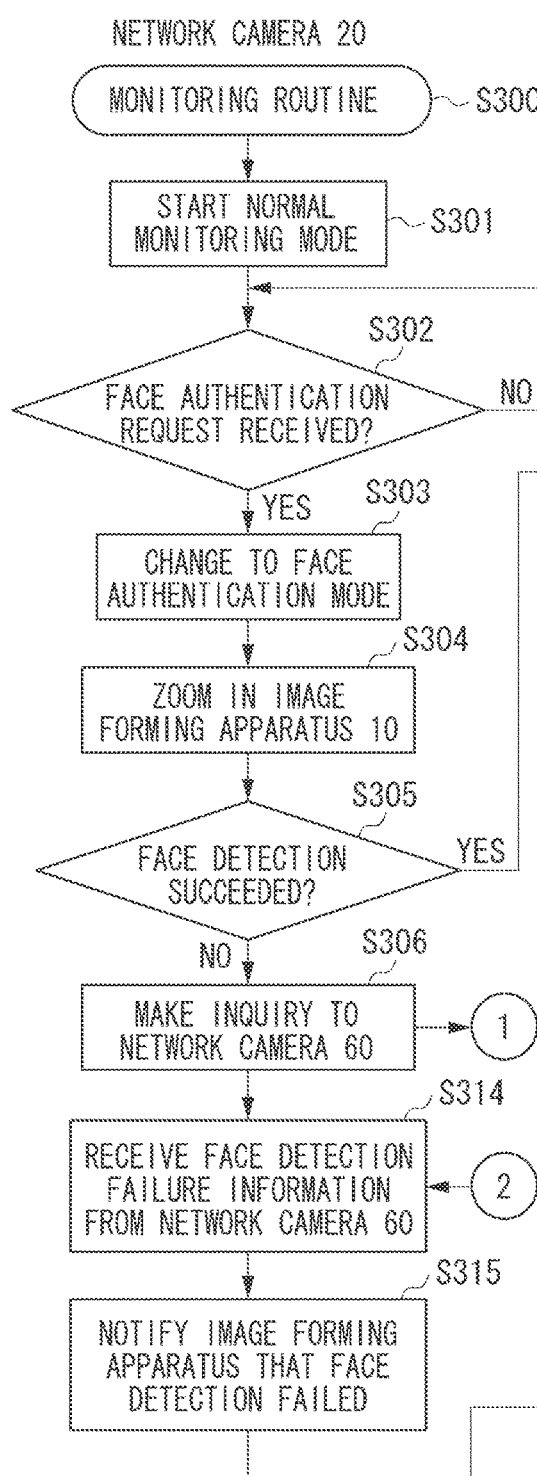

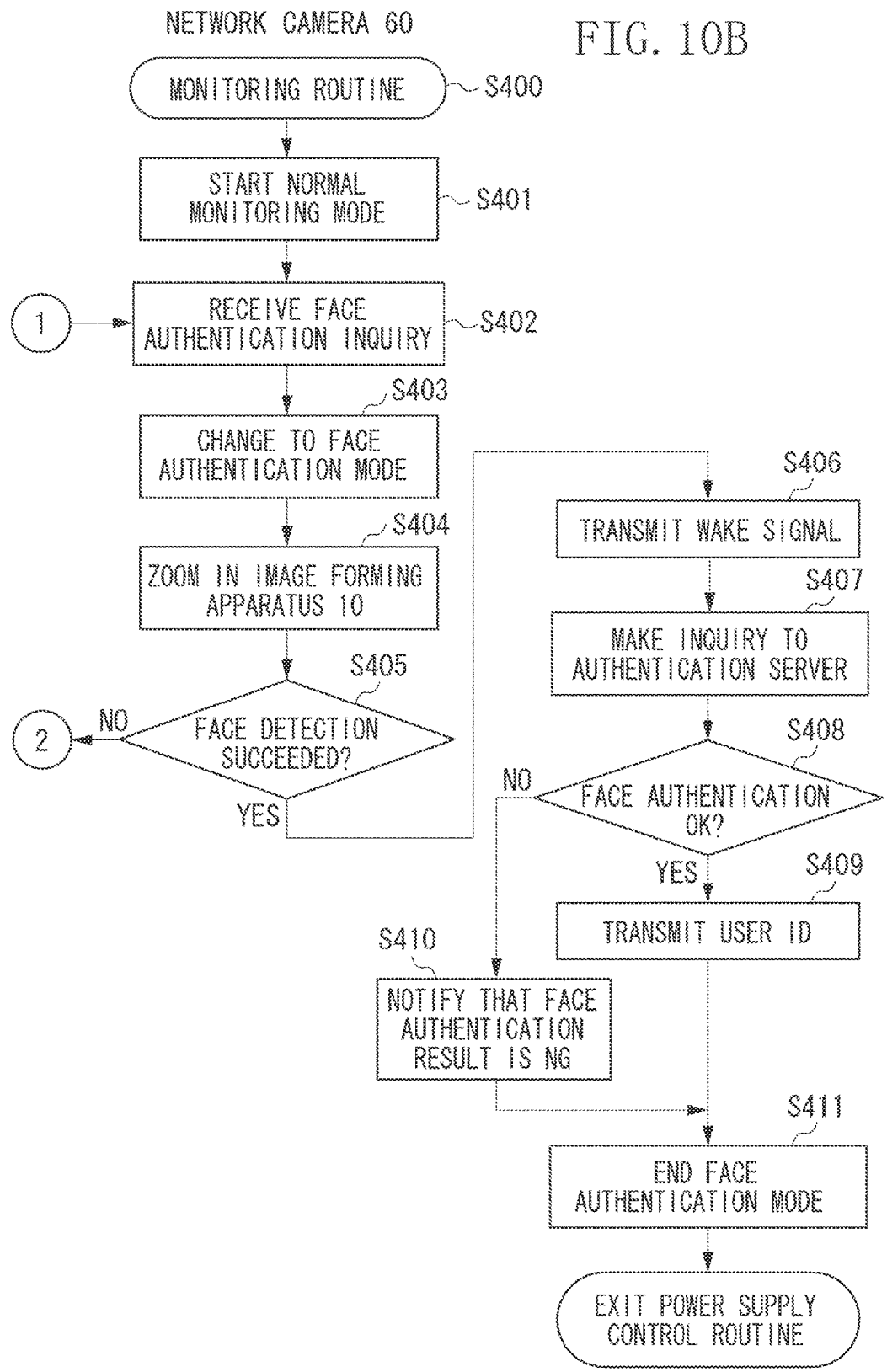

SYSTEM, IMAGE FORMING APPARATUS, AND NETWORK CAMERA APPARATUS

BACKGROUND

Field

Aspects of the present invention generally relate to a system, an image forming apparatus, and a network camera apparatus.

Description of the Related Art

Japanese Patent Application Laid-Open No. 2013-21405 discusses an image forming apparatus having a charge-coupled device (CCD) camera.

Conventionally, there has been discussed an image forming apparatus that performs authentication using a camera included in the apparatus, but there has not been proposed any collaborative operation between the image forming apparatus and a network camera connected thereto via a network.

SUMMARY

An aspect of the present invention is generally directed to a system for achieving a collaborative operation between an image forming apparatus and a network camera apparatus.

According to an aspect of the present invention, a system includes an image forming apparatus and a network camera apparatus. The image forming apparatus includes a detection unit configured to detect a user of the image forming apparatus, and a transmission unit configured to, in a case where the detection unit detects the user, transmit an imaging request to the network camera apparatus. The network camera apparatus includes an imaging unit, a receiving unit configured to receive the imaging request transmitted from the image forming apparatus, and a first control unit configured to, in a case where the receiving unit receives the imaging request, control the imaging unit to image a vicinity of the image forming apparatus that has transmitted the imaging request.

Further features of the present disclosure will become apparent from the following description of exemplary embodiments with reference to the attached drawings.

BRIEF DESCRIPTION OF THE DRAWINGS

FIG. 8 is a flowchart illustrating a method for controlling a camera apparatus according to the first exemplary embodiment.

FIG. 10 (consisting of FIGS. 10A and 10B) is a flowchart illustrating a method for controlling a camera apparatus according to the second exemplary embodiment.

DESCRIPTION OF THE EMBODIMENTS

Exemplary embodiments will be described below with reference to the drawings.

<Description of System Configuration>

Figure 1:
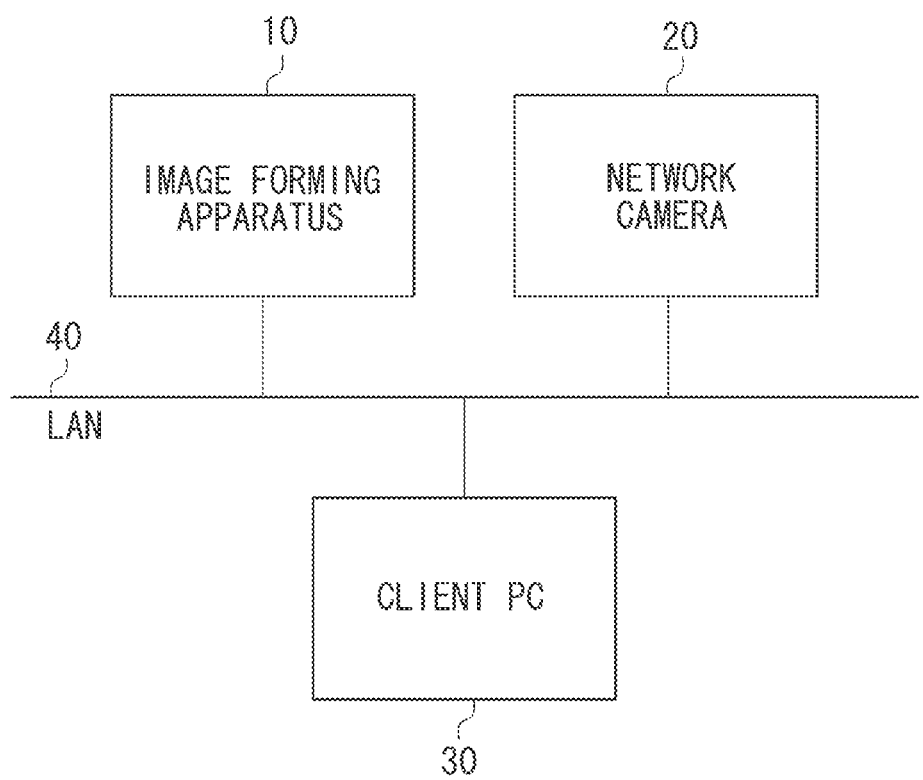
FIG. 1 is a block diagram illustrating a configuration of a system including an image forming apparatus according to a first exemplary embodiment.

FIG. 1 is a block diagram illustrating a configuration of an image forming system including an image forming apparatus and a camera apparatus according to a first exemplary embodiment. FIG. 1 illustrates an example of a system in which an image forming apparatus 10, a network camera 20 for imaging its vicinity including the image forming apparatus 10, and a client personal computer (PC) 30 are connected via a network 40. The network camera 20 is configured in such a manner that a lens position can be moved to capture the image of an area where the image forming apparatus 10 is installed. The network camera 20 is further configured in such a manner that an imaging mode in which a camera performs imaging can be changed from a normal monitoring mode to a face authentication mode for authenticating the face of a person approaching the image forming apparatus 10. The present exemplary embodiment assumes a system in which the network camera 20 and the image forming apparatus 10 are paired in advance to perform face authentication on a person approaching the image forming apparatus 10.

The image forming apparatus 10 is provided with functions of editing, printing, faxing, and copying an image. The network camera 20 is provided with functions of clipping a specific area from a captured image, and recording and analyzing the clipped area. The network camera 20 may be installed at any position where a desired area and the image forming apparatus 10 can be imaged.

The image forming system may include a recording server for storing video data captured by the network camera 20, a management server for controlling the network camera 20, an authentication server for performing face authentication, and a position server for managing the position of each client PC. The present exemplary embodiment will be described below on the premise that the network camera 20 is provided with these functions, and performs processing.

In the present exemplary embodiment, the network camera 20 includes an image sensor, such as a CCD sensor, receives a request from the image forming apparatus 10, authenticates and identifies a person in the vicinity of the image forming apparatus 10, and then transmits relevant user information to the image forming apparatus 10, as a result of the authentication. A user inputs a print job to the image forming apparatus 10 and acquires apparatus information of the image forming apparatus 10 from the client PC 30. The client PC 30 may be a tablet terminal, a smart phone, or any other kinds of apparatuses.

Each of the apparatuses illustrated in FIG. 1 includes hardware components, such as a central processing unit (CPU), a random access memory (RAM), a read only memory (ROM), a hard disk drive (HDD), and a network interface card.

Figure 2:
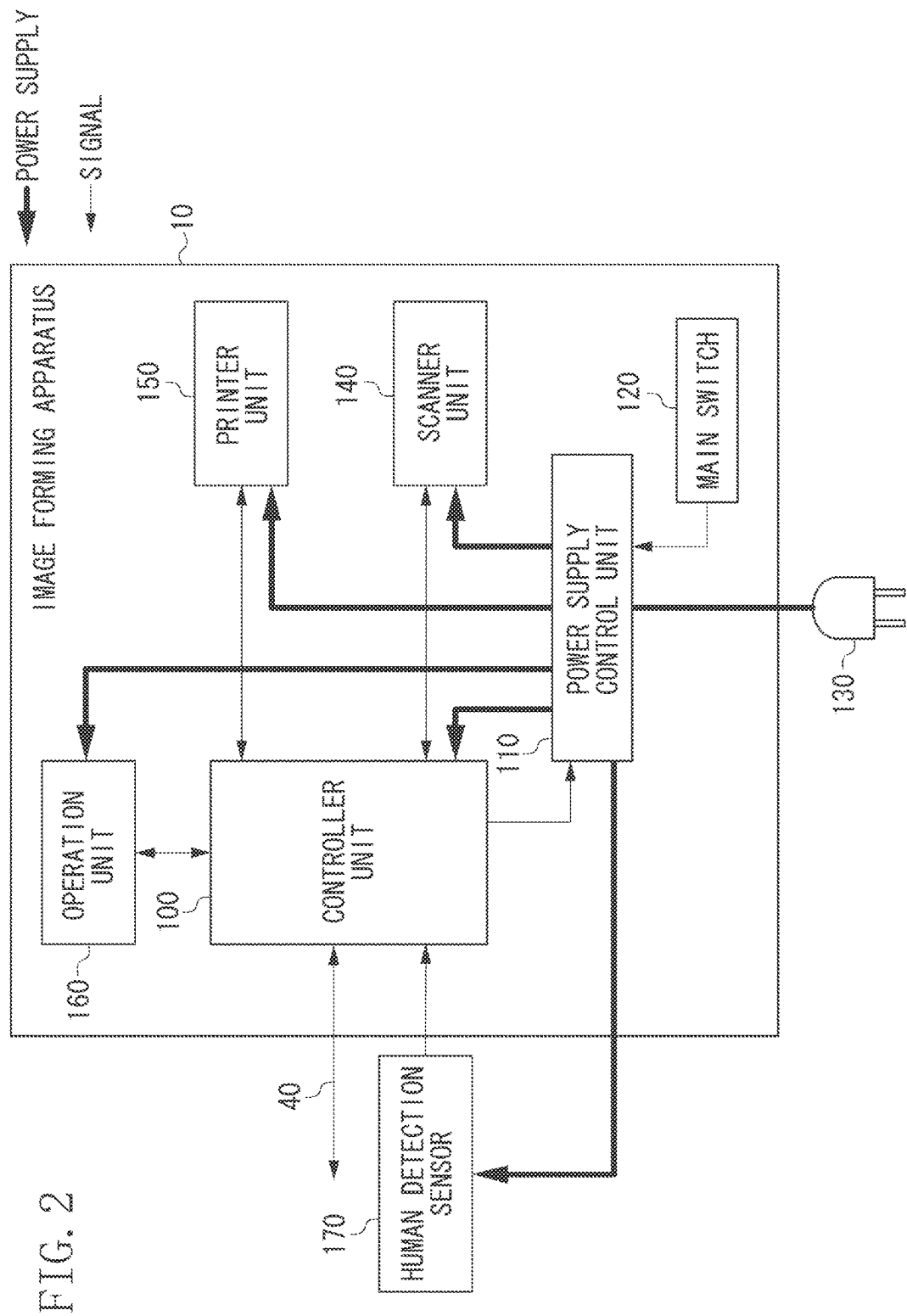
FIG. 2 is a block diagram illustrating an internal configuration of the image forming apparatus.

FIG. 2 is a block diagram illustrating an internal configuration of the image forming apparatus 10 illustrated in FIG. 1. A flow of each processing operation performed by the image forming apparatus 10 will be described below with reference to FIG. 2.

To turn ON power of the image forming apparatus 10, the user turns ON a main switch 120. As a result, a power supply control unit 110 generates a plurality of necessary power sources from power supplied from a power plug 130. Each of the generated power sources is supplied to a scanner unit 140, a printer unit 150, an operation unit 160, a controller unit 100, and a human detection sensor 170. To turn OFF power of the image forming apparatus 10, the user turns OFF the main switch 120. The power supply control unit 110 thereby stops power supply to the scanner unit 140, the printer unit 150, the operation unit 160, the controller unit 100, and the human detection sensor 170.

When the user inputs a print job to the image forming apparatus 10 via the network 40, job data is transferred to the controller unit 100 via the network 40, and is once stored in the RAM. The controller unit 100 converts the stored job data into image data (raster image processing (RIP)), and transfers the image data to the printer unit 150. Under the control of the controller unit 100, the printer unit 150 prints the image data on recording paper (sheet) and discharges the recording paper to the outside of the image forming apparatus 10. Predetermined sheet post-processing may be performed depending on an option configuration of the printer unit 150. Options include stapling and folding functions accompanying bookbinding processing.

On the other hand, when the user executes a scan job on the image forming apparatus 10, the user sets a document onto the scanner unit 140 first, and then operates buttons while referring to the screen of the operation unit 160 to set a scanning operation and instruct to start the scanning operation. Under the control of the controller unit 100, the scanner unit 140 optically reads a document and converts read data into image data. The controller unit 100 once stores the image data in the RAM of the controller unit 100, and then transfers the image data to a destination specified on the operation unit 160 in advance.

When the user executes a copy job on the image forming apparatus 10, the user sets a document onto the scanner unit 140 first and then operates buttons while referring to the screen of the operation unit 160 to set a copy operation and instruct to start the copy operation.

In this case, under the control of the controller unit 100, the scanner unit 140 optically reads a document and converts read data into image data. The controller unit 100 once stores the image data in the RAM of the controller unit 100, and then converts the image data into a data format applicable to the printer unit 150. The printer unit 150 prints the image data on recording paper and discharges the recording paper to the outside of the image forming apparatus 10.

Figure 3:
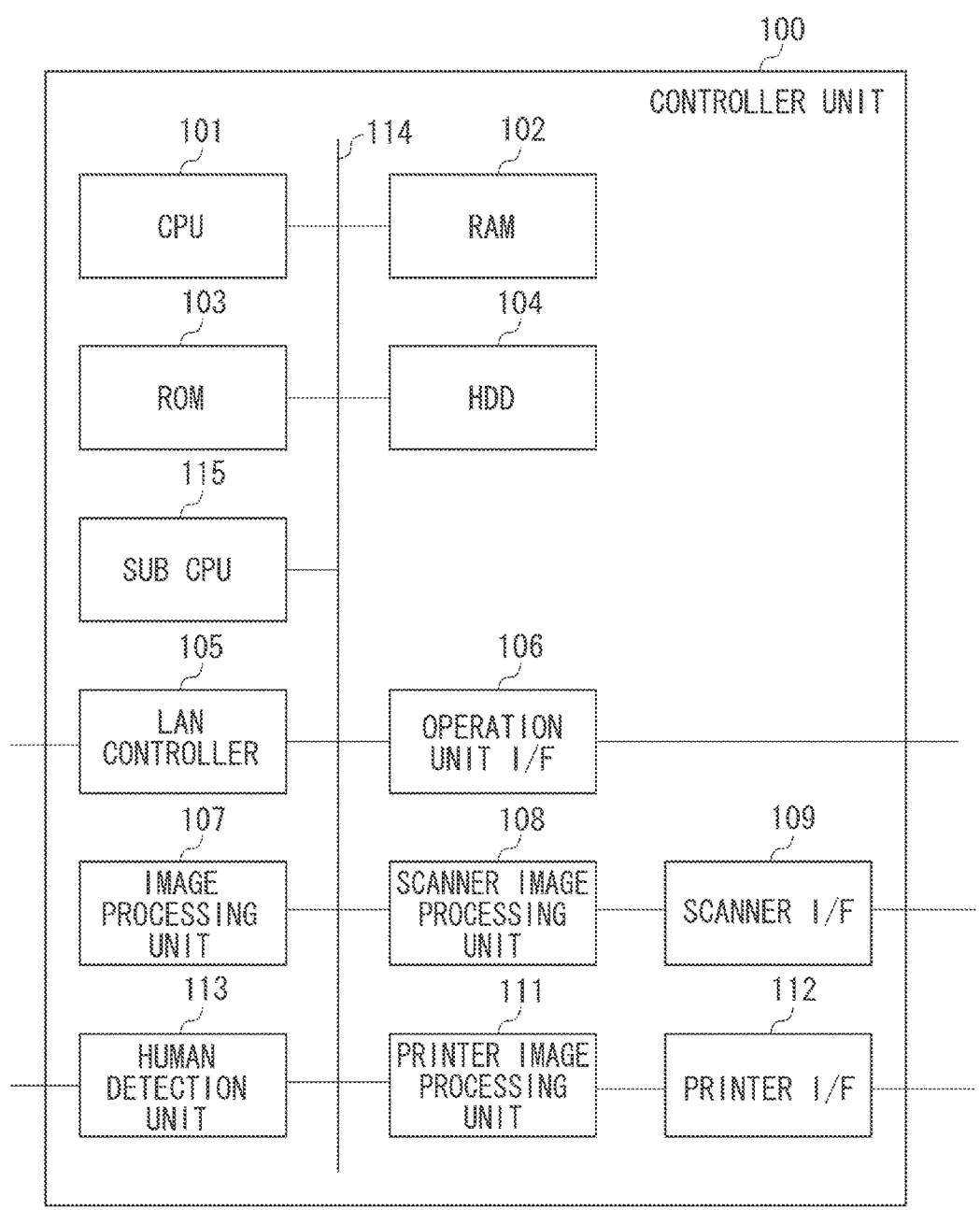
FIG. 3 is a block diagram illustrating an internal configuration of a controller unit illustrated in FIG. 2.

FIG. 3 is a block diagram illustrating an internal configuration of the controller unit 100 illustrated in FIG. 2.

The controller unit 100 is electrically connected with the scanner unit 140 and the printer unit 150 while being connected with a PC and an external apparatus via the network 40. This allows image data and device information to be input and output.

A CPU 101 totally controls access to various devices connected as well as various processing operations performed inside the controller unit 100, based on control programs stored in a ROM 103.

A RAM 102 serves as a system work memory used by the CPU 101 to operate, and also serves as a memory for temporarily storing image data. The RAM 102 includes a static random access memory (SRAM) which retains the stored contents even after power is turned OFF, and a dynamic random access memory (DRAM) which does not retain the stored contents after power is turned OFF.

The ROM 103 stores a boot program of the image forming apparatus 10. An HDD 104 is a hard disk drive capable of storing system software and image data.

A sub CPU 115 is a processor which is lower in price than the CPU 101 and can process only limited contents. When the image forming apparatus 10 is in an energy-saving mode described below, the CPU 101 is in the power OFF state, and the sub CPU 115 and a local area network (LAN) controller 105 are in the power ON state. As a result, the sub CPU 115 can respond to a network packet inquiry from the client PC 30 or a server via the network 40 as a proxy for the CPU 101.

An operation unit interface (I/F) 106 is an interface for connecting a system bus 114 and the operation unit 160. The operation unit I/F 106 receives from the system bus 114 image data to be displayed on the operation unit 160, outputs the image data to the operation unit 160, and also outputs to the system bus 114 information input from the operation unit 160.

The LAN controller 105 connects with the network and the system bus 114 to perform information input/output control.

An image processing unit 107 performs predetermined image processing. More specifically, the image processing unit 107 reads image data stored in the RAM 102, and performs image processing, such as enlargement, reduction, and color adjustment on Joint Photographic Experts Group (JPEG) and Joint Bi-level Image experts Group (JBIG) data.

A scanner image processing unit 108 performs correction, modification, and editing processing on image data received from the scanner unit 140 via a scanner I/F 109. The scanner image processing unit 108 determines whether the received image data is a color document, a monochrome document, a text document, or a photograph document. Then, the scanner image processing unit 108 adds the result of the determination to the image data. Such additional information is referred to as attribute data.

A printer image processing unit 111 performs image processing on the image data, while referring to the attribute data added to the image data. The image data that has been subjected to the image processing is output to the printer unit 150 via a printer I/F 112.

A human detection unit 113 controls the human detection sensor 170. When the human detection sensor 170 keeps a detection state for a predetermined time period, the human detection unit 113 asserts a human detection signal to the power supply control unit 110.

Figure 4:
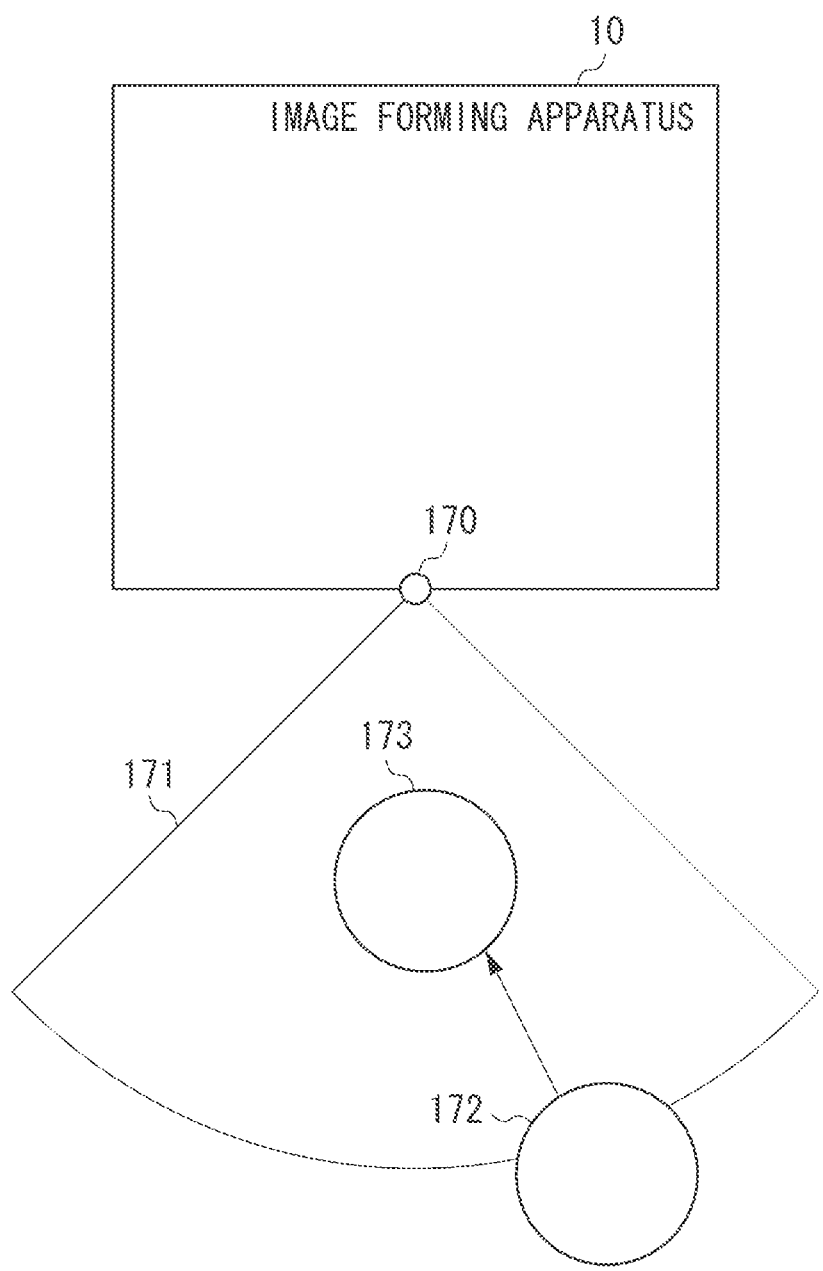
FIG. 4 illustrates an arrangement position of a human detection sensor and a range of human detection.

FIG. 4 illustrates an arrangement position and a range of human detection of the human detection sensor 170 illustrated in FIG. 3. In the present exemplary embodiment, the human detection sensor 170 is arranged on the front face of the image forming apparatus 10. The human detection sensor 170 is composed of, for example, a pyroelectric sensor, and can detect a person with a certain amount of width and distance, as illustrated by a human detection area 171.

When a person approaching the image forming apparatus 10 exists at a first position 172, the human detection unit 113 asserts the human detection signal. Then, after a predetermined time period has elapsed, the human detection unit 113 maintains the detection state until the person moves to a second position 173. At this timing, the human detection unit 113 asserts the human detection signal. It is necessary for the human detection unit 113 to wait for a predetermined time period to reduce the possibility of incorrect detection.

Figure 5:
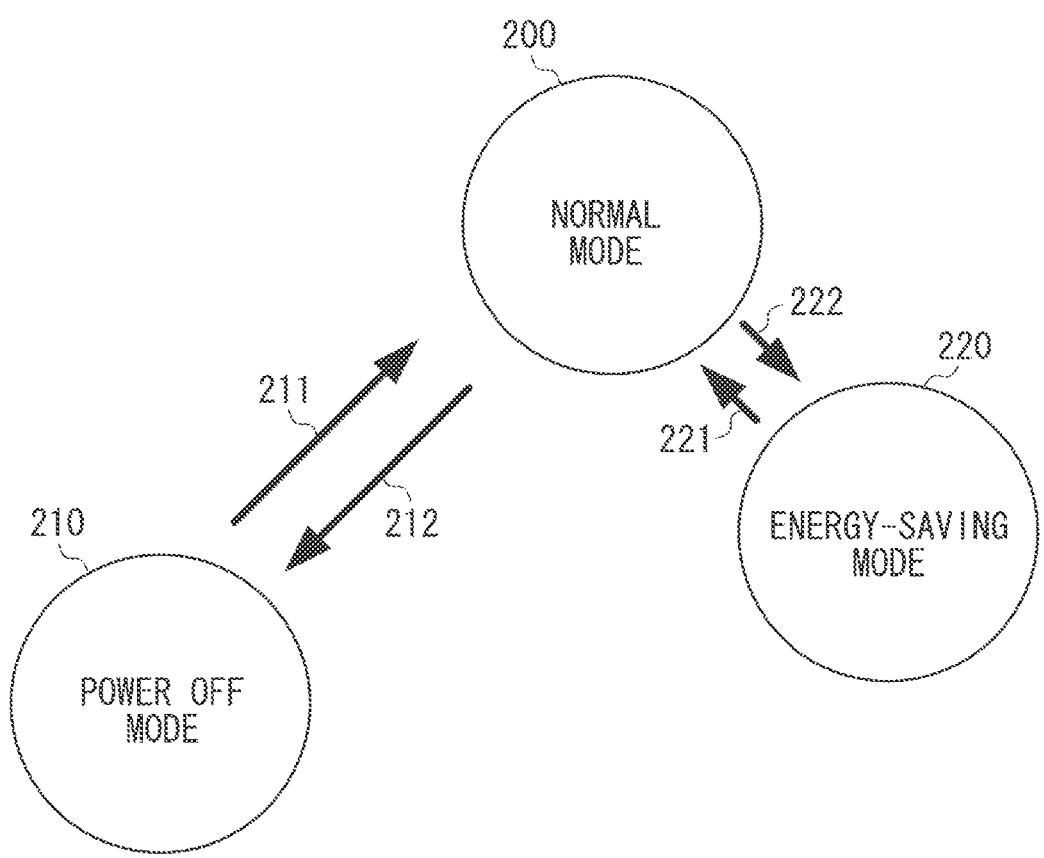
FIG. 5 is a state transition diagram illustrating a power consumption state of the image forming apparatus.

FIG. 5 is a state transition diagram illustrating a power consumption state of the image forming apparatus 10 illustrated in FIG. 1.

Referring to FIG. 5, the image forming apparatus is provided with three different operation modes: a normal mode 200, a power OFF mode 210, and an energy-saving mode 220.

Power supply control for all the three states is performed by the power supply control unit 110. The normal mode 200 is entered when the main switch 120 is turned ON in the power OFF mode 210 (transition 211), as described above. In the normal mode 200, power is supplied from the power supply control unit 110 to each unit. The normal mode 200 corresponds to a standby state where a print job, a scanner job, and a copy job can be immediately executed.

The power OFF mode 210 is entered when the main switch 120 is turned OFF in the normal mode 200 (transition 212), as described above. In the power OFF mode 210, power supply from the power supply control unit 110 to each unit is stopped.

The energy-saving mode 220 is entered when a state where the image forming apparatus 10 is not performing predetermined job processing lasts for a predetermined time period (transition 222). In the energy-saving mode 220, power supply is stopped except for the power supply control unit 110, the human detection sensor 170, and the sub CPU 115 and the LAN controller 105 in the controller unit 100 to reduce power consumption. In the power OFF mode 210, the energy-saving mode 220, and the normal mode 200, power consumption becomes lower in this order. The normal mode 200 corresponds to a first power state. The energy-saving mode 220 corresponds to a second power state where power consumption is lower than the first power state.

In the energy-saving mode 220, the power supply control unit 110 can detect job reception via the network 40, the human detection sensor 170 can detect a person, and the above-described packet response as a proxy for the CPU 101 can be made.

The image forming apparatus 10 changes from the energy-saving mode 220 to the normal mode 200 (transition 221) when one of two conditions is satisfied. A first condition is that job reception is detected via the network 40. A second condition is that human detection and face authentication are performed.

When the human detection sensor 170 detects a person, the human detection unit 113 asserts the human detection signal to the power supply control unit 110. When the human detection signal has been asserted for a predetermined time period, the power supply control unit 110 notifies the sub CPU 115 in the controller unit 100 of the signal assertion. Then, the sub CPU 115 makes an inquiry to the network camera 20 about a result of the face authentication, via the LAN controller 105 and the network 40. When it is determined that the user of the image forming apparatus 10 has been detected from the result of the face authentication, i.e., when the above-described second condition is satisfied, the image forming apparatus 10 changes the operation mode from the energy-saving mode 220 to the normal mode 200 (transition 221).

Figure 6:
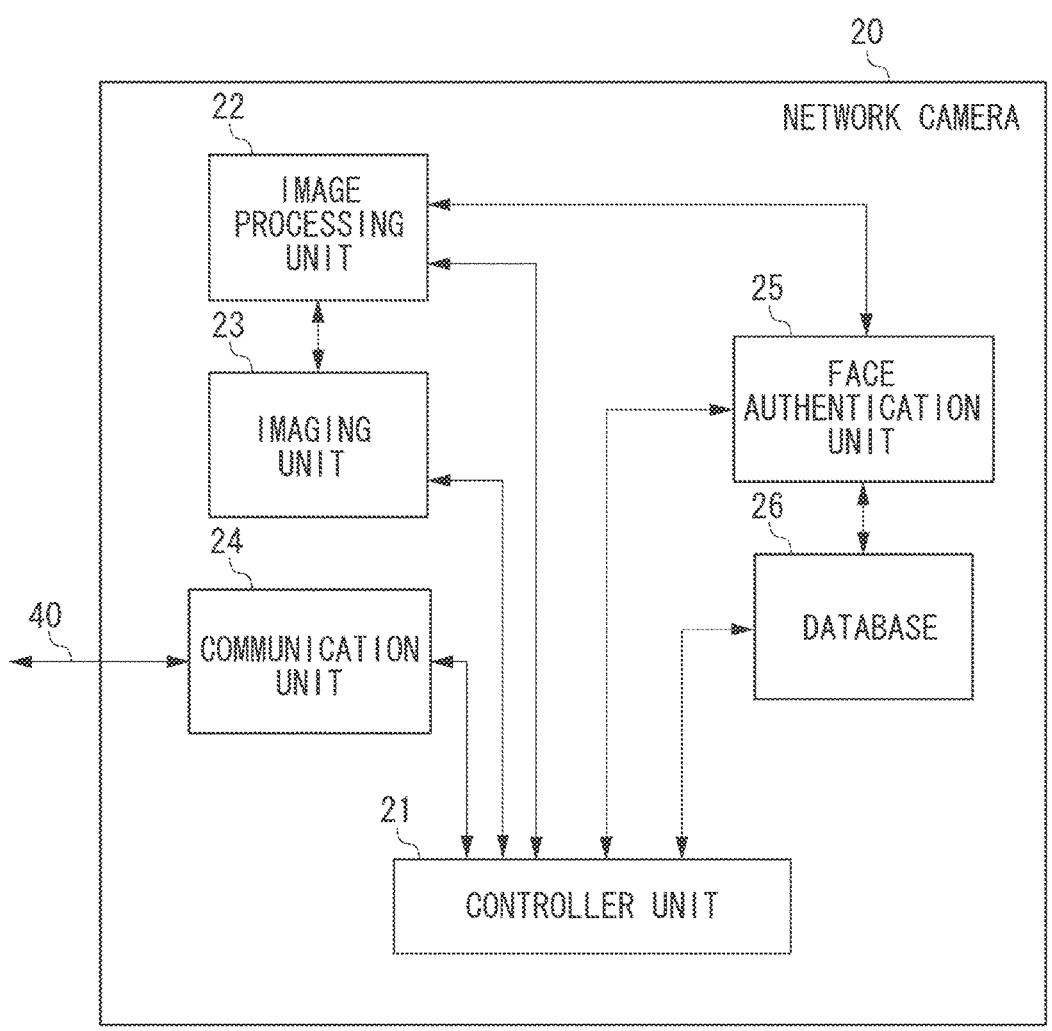
FIG. 6 is a block diagram illustrating a configuration of a network camera illustrated in FIG. 1.

FIG. 6 is a block diagram illustrating a configuration of the network camera 20 illustrated in FIG. 1.

Referring to FIG. 6, a controller unit 21 performs control to change the operation mode (normal operation mode and face authentication mode) of the network camera 20, and controls each processing unit according to the operation mode. A communication unit 24 communicates with the image forming apparatus 10 via the network 40. When the communication unit 24 receives a face authentication inquiry from the image forming apparatus 10, the communication unit 24 notifies the controller unit 21 of the inquiry, and the controller unit 21 changes the operation mode to the face authentication mode.

An imaging unit 23 including an image sensor, such as a CCD sensor, performs imaging in accordance with the operation mode instructed by the controller unit 21.

In the present exemplary embodiment, in the face authentication mode, the imaging unit 23 performs face detection and face authentication in the vicinity of the image forming apparatus 10 which has requested the face authentication. The imaging unit 23 transfers a captured image to an image processing unit 22. The image processing unit 22 clips a video image, searches for a target object, and converts the clipped video image into a still image. The image processing unit 22 transfers the captured image subjected to the image processing to a face authentication unit 25. The face authentication unit 25 performs face detection, face feature extraction, and face collation on the captured image. In the face collation, the face authentication unit 25 communicates with a database 26 to collate the captured image with preregistered face information. The database 26 may be provided outside the network camera 20.

For video data stored in a data storage unit (not illustrated), the image processing unit 22 of the network camera 20 clips a video image, searches for a target object, and converts the clipped video image into a still image. In the present exemplary embodiment, the image processing unit 22 clips a video image for a specified time period from stored video data, searches for a person in the vicinity of the image forming apparatus 10 in the database to identify the person, and transmits the relevant information to the image forming apparatus 10.

Figure 7B:
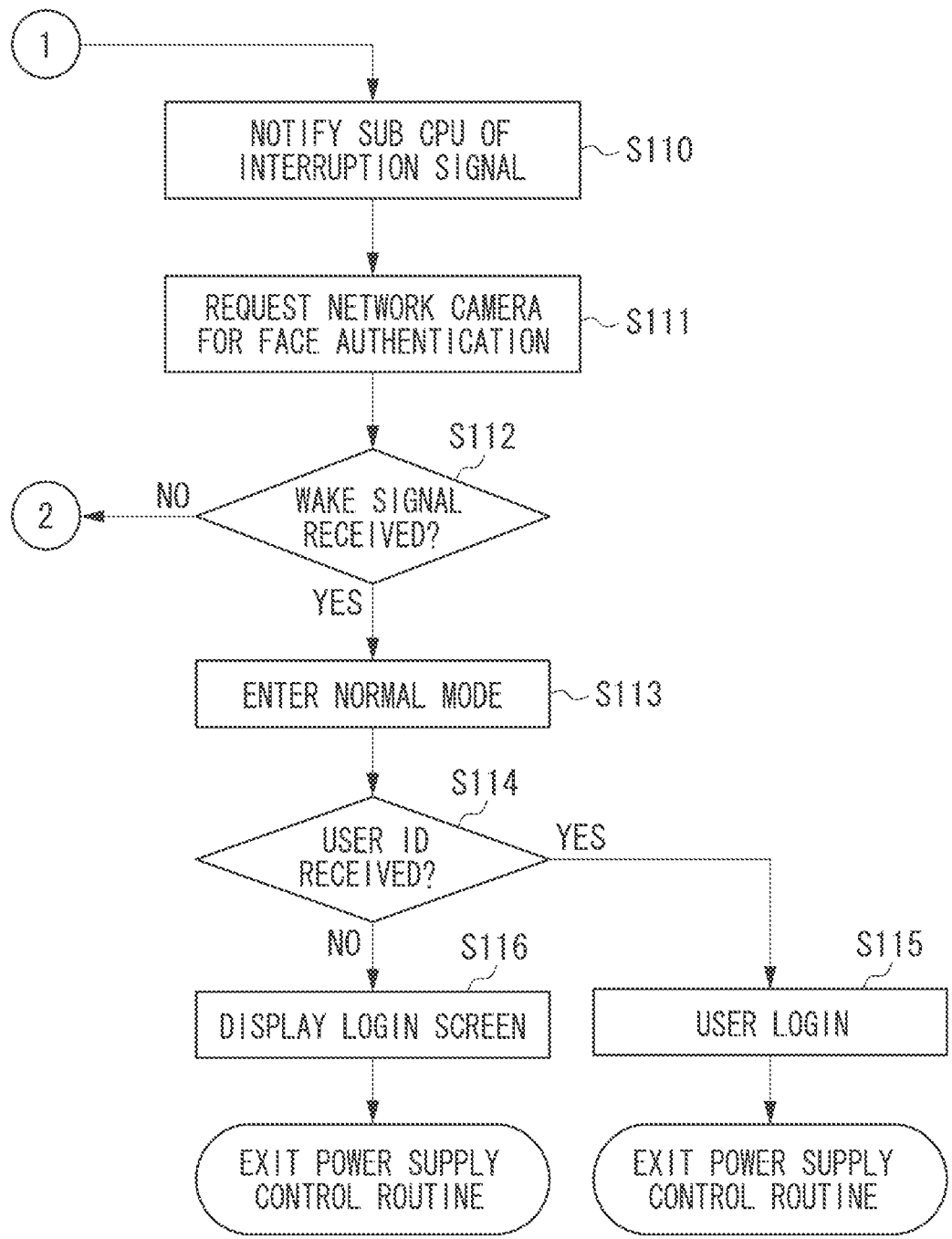
FIG. 7 (consisting of FIGS. 7A and 7B) is a flowchart illustrating a method for controlling the image forming apparatus according to the first exemplary embodiment.

FIG. 7 (consisting of FIGS. 7A and 7B) is a flowchart illustrating a method for controlling the image forming apparatus 10 according to the present exemplary embodiment. The flowchart in FIG. 7 illustrates an example of processing performed by the image forming apparatus 10 when the user performs an operation on the image forming apparatus 10 via the operation unit 160 of the image forming apparatus 10. In each step, each processing unit reads a control program from the ROM 103 or the HDD 104, and the CPU 101 executes the program and then stores the result of the processing and data in the RAM 102, the ROM 103, or the HDD 104, thereby performing reception and transmission of data among the processing units. Each apparatus transmits and receives data to/from other apparatuses by using a network interface card.

In step S101, the human detection unit 113 negates the human detection signal. In step S102, the human detection unit 113 turns ON the human detection sensor 170. In step S103, a state where the image forming apparatus 10 is not performing job processing lasts for a predetermined time period, a power consumption state of the image forming apparatus 10 shifts to the energy-saving mode 220, as indicated by the transition 222 illustrated in FIG. 5. In the energy-saving mode 220, when the human detection sensor 170 detects a person approaching the image forming apparatus 10 (YES in step S104), then in step S105, the human detection unit 113 asserts the human detection signal to the power supply control unit 110.

Subsequently, in step S106, the power supply control unit 110 starts timer count for human detection. When the human detection state lasts for a predetermined time period (YES in step S107), then in step S110, the power supply control unit 110 notifies the sub CPU 115 of a human detection interruption signal. On the other hand, when the human detection state is turned OFF within the predetermined time period (NO in step S108), then in step S109, the human detection unit 113 negates the human detection signal. Then, the processing returns to step S102.

In step S111, the sub CPU 115 requests the network camera 20 to perform face authentication, via the LAN controller 105 and the network 40.

In this case, the network camera 20 is installed in a place where face authentication can be performed on the image forming apparatus 10. The installation position and model information of the image forming apparatus 10 have been notified to the network camera 20 in advance. Thus, in the initial setting, it is necessary to determine which image forming apparatus is to be monitored for authentication by which network camera (this operation is referred to as pairing).

The network 40 performs face detection and face authentication in the vicinity of the image forming apparatus 10 which has requested the face authentication. When the network camera 20 has performed the face detection successfully, the network camera 20 transmits a wake signal to the image forming apparatus 10. When the network camera 20 has succeeded in the face authentication, the network camera 20 transmits a user ID to the image forming apparatus 10.

When the image forming apparatus 10 receives the wake signal from the network camera 20 (YES in step S112), then in step S113, the image forming apparatus 10 enters the normal mode 200 (transition 221). When the CPU 101 determines that the image forming apparatus 10 has received the user ID from the network camera 20 (YES in step S114), then in step S115, the CPU 101 performs automatic login for the relevant user. Then, the processing exits the power supply control routine. On the other hand, when the CPU 101 determines that user ID has not been received (NO in step S114), then in step S116, the CPU 101 displays a user login screen on the operation unit 160 to prompt the user to perform login processing. Then, the processing exits the power supply control routine.

FIG. 8 is a flowchart illustrating a method for controlling the camera apparatus according to the present exemplary embodiment. The flowchart in FIG. 8 illustrates an example of processing performed by the network camera 20 when the user operates the image forming apparatus 10 via the operation unit 160 of the image forming apparatus 10. Each step is performed by a CPU included in the controller unit 21 executing a stored control program. Although it is assumed in the present exemplary embodiment that face authentication is performed on a captured image of a human face by using an external authentication server (not illustrated), the face authentication unit 25 illustrated in FIG. 6 may perform similar processing.

In step S201, the controller unit 21 of the network camera 20 starts the normal monitoring mode. In step S202, the controller unit 21 determines whether a face authentication request has been received from the image forming apparatus 10. When the controller unit 21 determines that the face authentication request has been received from the image forming apparatus 10 (YES in step S202), then in step S203, the controller unit 21 changes the operation mode from the normal monitoring mode to the face authentication mode. In step S204, in the face authentication mode, the controller unit 21 of the network camera 20 changes the imaging state of the imaging unit 23 of the network camera 20 from the normal state to the face authentication state, and focuses on and zooms in the image forming apparatus 10 which has requested the face authentication. In step S205, the controller unit 21 performs the face detection. When the controller unit 21 determines that face detection has succeeded (YES in step S205), the controller unit 21 determines that a certain user is using the image forming apparatus 10. Then, in step S207, the controller unit 21 transmits the wake signal to the image forming apparatus 10. The wake signal functions as a signal for changing the power state of the image forming apparatus 10, and is used to perform the processing in step S112 or the subsequent steps described above.

On the other hand, when the controller unit 21 determines that face detection has failed (NO in step S205), then in step S206, the controller unit 21 notifies the image forming apparatus 10 that the face detection has failed. In step S208, the controller unit 21 makes an inquiry to the authentication server about the detected face information. In step S209, the controller unit 21 determines whether the detected face information matches with preregistered user information. When the controller unit 21 determines the result of the face authentication acquired from the authentication server as "Face Authentication OK" (YES in step S209), then in step S210, the controller unit 21 notifies the image forming apparatus 10 of the user ID. "Face Authentication OK" indicates that the face authentication has succeeded.

On the other hand, when the controller unit 21 determines the result of the face authentication acquired from the authentication server as "Face Authentication NG" (NO in step S209), then in step S211, the controller unit 21 notifies the image forming apparatus 10 that the result of face authentication is NG. "Face Authentication NG" indicates that the face authentication has failed. After the controller unit 21 has notified the image forming apparatus 10 of the result of the face authentication, then in step S212, the controller unit 21 of the network camera ends the face authentication mode, and changes the operation mode to the normal monitoring mode. Then, the processing exits the power supply control routine.

Although, in the present exemplary embodiment, an image of a person captured by the network camera 20 is compared with registered user images by using the authentication server to perform face authentication, user image information stored in the database 26 may be used, as illustrated in FIG. 6.

According to the present exemplary embodiment, two-step power supply control is performed by using the human detection sensor 170 of the image forming apparatus and the face authentication function of the network camera 20. This allows reducing the system cost and increasing the speed of individual authentication, thereby achieving both low power consumption and high-precision individual authentication.

Figure 9:
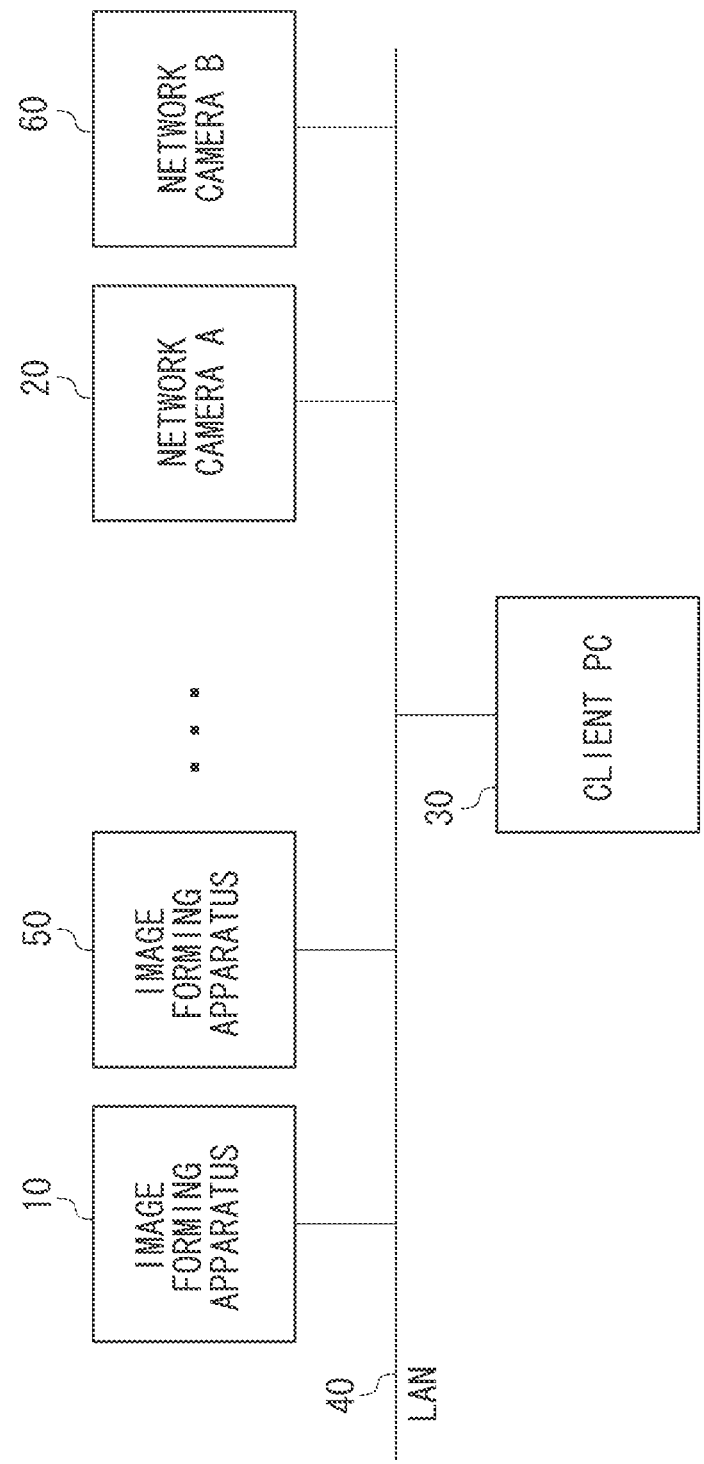
FIG. 9 is a block diagram illustrating a configuration of a system including a plurality of image forming apparatuses according to a second exemplary embodiment.

FIG. 9 is a block diagram illustrating a configuration of a system including a plurality of image forming apparatuses according to a second exemplary embodiment. FIG. 9 illustrates an example of a multisystem including a plurality of the image forming apparatuses 10 and the network cameras 20 according to the first exemplary embodiment. The user inputs a print job in any one of image forming apparatuses from a client PC 30. The client PC 30 has a predetermined operating system and driver software installed therein, and is configured in such a manner that the client PC 30 can communicate with the image forming apparatuses 10 and 50.

In the system illustrated in FIG. 9, a plurality of the image forming apparatuses 10 and 50 and a plurality of the network cameras 20 and 60 exist in the same network. It is assumed that, in this system, the image forming apparatus 10 is paired with the network cameras 20 and 60.

The flow of processing performed by the image forming apparatus 10 when the user performs an operation on the operation unit 160 of the image forming apparatus 10 is similar to the flow of processing illustrated in FIG. 7 in the first exemplary embodiment, and descriptions thereof will be omitted.

FIG. 10 (consisting of FIGS. 10A and 10B) is a flowchart illustrating a method for controlling a camera apparatus according to the present exemplary embodiment. The flowchart in FIG. 10 illustrates an example of processing performed by the network cameras 20 and 60 when the user performs an operation on the operation unit 160 of the image forming apparatus 10. Each step is performed by the CPU included in the controller unit 21 of each of the network cameras 20 and 60 executing a stored control program. Although it is assumed in the present exemplary embodiment that face authentication is performed on a captured image of a human face by using an external authentication server (not illustrated), the face authentication unit 25 illustrated in FIG. 6 may perform similar processing.

In step S301, the controller unit 21 of the network camera 20 starts the normal monitoring mode. In step S302, the controller unit 21 of the network camera 20 determines whether a face authentication request has been received from the image forming apparatus 10. When the controller unit 21 of the network camera 20 determines that a face authentication request has been received (YES in step S302), then in step S303, the controller unit 21 of the network camera 20 changes the operation mode from the normal monitoring mode to the face authentication mode. In step S304, in the face authentication mode, the controller unit 21 of the network camera 20 focuses on and zooms in the image forming apparatus 10 which has requested the face authentication. In step S305, the controller unit 21 of the network camera 20 performs face detection. When the controller unit 21 of the network camera 20 determines that the face detection has succeeded (YES in step S305), the controller unit 21 of the network camera 20 determines that a certain user is using the image forming apparatus 10. Then, in step S307, the controller unit 21 of the network camera 20 transmits the wake signal to the image forming apparatus 10.

In step S308, the controller unit 21 of the network camera 20 makes an inquiry to the authentication server about the detected face information. In step S309, the controller unit 21 determines whether the detected face information matches with preregistered user information. When the controller unit 21 of the network camera 20 determines the result of the face authentication as "Face Authentication OK" (YES in step S309), then in step S310, the controller unit 21 notifies the image forming apparatus 10 of the user ID.

On the other hand, when the controller unit 21 of the network camera 20 determines the result of the face authentication as "Face Authentication NG" (NO in step S309), then in step S311, the controller unit 21 notifies the image forming apparatus 10 that the result of face authentication is NG. After the controller unit 21 has notified the image forming apparatus 10 of the result of the face authentication, then in step S312, the controller unit 21 of the network camera 20 ends the face authentication mode, and changes the operation mode to the normal monitoring mode.

On the other hand, when the controller unit 21 of the network camera 20 determines that the face detection has failed (NO in step S305), then in step S306, the controller unit 21 makes an inquiry to the network camera 60. In step S314, the controller unit 21 of the network camera 20 receives information notifying that the face detection has failed from the network camera 60. In step S315, the controller unit 21 of the network camera 20 notifies the image forming apparatus 10 that the face detection has failed. Then, the processing exits the power supply control routine.

On the other hand, in step S401, the network camera 60 also starts the normal monitoring mode similarly to the network camera 20. When the network camera 20 has failed in the face detection, the network camera 60 receives an inquiry in step S402, and then the network camera 60 changes the operation mode from the normal monitoring mode to the face authentication mode in step S403. In step S404, the network camera 60 focuses on and zooms in the image forming apparatus 10 which has requested the face authentication. In step S405, the network camera 60 performs face detection. When the network camera 60 determines that the face detection has succeeded (YES in step S405), the network camera 60 determines that a certain user is using the image forming apparatus 10. Then, in step S406, the network camera 60 transmits the wake signal to the image forming apparatus 10. On the other hand, when the network camera 60 determines that the face detection has failed (NO in step S405), the network camera 60 notifies the network camera 20 that the face detection has failed.

In step S407, the controller unit 21 of the network camera 60 makes an inquiry to the authentication server about the detected face information. In step S408, the controller unit 21 of the camera 60 determines whether the detected face information matches with preregistered user information. When the controller unit 21 of the network camera 60 determines the result of the face authentication as "Face Authentication OK" (YES in step S408), then in step S409, the controller unit 21 of the network camera 60 notifies the image forming apparatus 10 of the user ID.

On the other hand, when the controller unit 21 of the network camera 60 determines the result of the face authentication as "Face Authentication NG" (NO in step S408), then in step S410, the controller unit 21 of the network camera 60 notifies the image forming apparatus 10 that the result of face authentication is NG. After the controller unit 21 of the network camera 60 has notified the image forming apparatus 10 of the result of the face authentication, then in step S411, the controller unit 21 of the network camera 60 ends the face authentication mode, and changes the operation mode to the normal monitoring mode. Then, the processing exits the power supply control routine.

According to the present exemplary embodiment, two-step power supply control can be performed by using the human detection sensor 170 of the image forming apparatus 10 and the network cameras 20 and 60. This improves a detection rate of user's faces, and allows reducing the system cost and increasing the speed of individual authentication, thereby achieving both low power consumption and high-precision individual authentication.

Control may be performed in the following way. When the human detection sensor 170 detects a person and the network camera 20 succeeds in face detection, and no operation is performed on an image forming apparatus for a predetermined time period, the image forming apparatus requests again the network camera 20 to perform face detection and face authentication processing. When the face detection fails, the power state of the image forming apparatus is changed again to a sleep state. In a case where a person who has once approached an image forming apparatus and is currently using another image forming apparatus next to the image forming apparatus, the above-described processing allows maintaining power-saving control for the image forming apparatus on which the relevant person has been detected first.

Control may be performed in the following way. When a network camera detects faces of a plurality of persons, the network camera notifies an image forming apparatus which has requested the face authentication of user information of a person closest to a user interface (UI) screen of the operation unit 160 in the image forming apparatus among the plurality of persons, as a face authentication result.

Control may be performed in the following way. The result of the face detection for a person approaching the image forming apparatus detected by the network camera is compared with the user ID of a job input to the image forming apparatus, such as a print job. When the person approaching the image forming apparatus is authenticated to be a user who has input the print job, user login is automatically completed and output for the print job is subsequently started.

Control may be performed in the following way. When the image forming apparatus enters the sleep state, similarly to when returning from the sleep state, if a sleep timer has counted a predetermined time period, the power state of the image forming apparatus is changed to the sleep state after confirming that neither the human detection sensor 170 nor the network camera has detected a person. In this case, when the human detection sensor 170 and a network camera detect a person, the time period for time count by the sleep timer may be extended.

Further, in a case where face authentication fails even when the human detection sensor 170 has detected a person or the network camera has detected a human face, the face of the user may not correctly face the network camera, for example. In this case, the image forming apparatus may be returned from the sleep state, and a user login screen may be displayed on the operation unit 160 to improve usability.

In a state where a predetermined period has elapsed even when the human detection sensor 170 temporarily detects a person, the image forming apparatus may enter a state where no person is detected. In other words, there is a case where a person approaches and passes by the image forming apparatus. For this reason, control may be performed in the following way. In a case where the network camera determines that human face detection has failed even when the human detection sensor 170 has temporarily detected a person, the controller unit determines that the person has approached and passed by the image forming apparatus and leaves the power state of the image forming apparatus in the sleep state.

Each process of the exemplary embodiments can also be achieved by executing software (program) acquired via a network or various storage media on a processing apparatus (CPU or processor), such as a personal computer.

The above-described exemplary embodiments are not limiting, and can be modified in various ways (including organic combinations of the exemplary embodiments) without departing from the spirit and scope thereof. These modifications are not excluded from the scope of the present disclosure.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-028394 filed Feb. 18, 2014, which is hereby incorporated by reference herein in its entirety.

What is claimed is:

1. A system comprising:
   an image forming apparatus, and
   a network camera that is attached to a position away from the image forming apparatus and able to communicate with the image forming apparatus via a network,
   wherein the image forming apparatus comprises:
   a detection unit configured to detect a user in a vicinity of the image forming apparatus and output a user detection signal based on a detection result; and
   a first transmission unit configured to, based on the user detection signal, transmit an imaging request to the network camera via the network, and
   wherein the network camera comprises:
   a receiving unit configured to receive the imaging request transmitted from the image forming apparatus via the network;
   an imaging unit configured to image and zooms in on the image forming apparatus and the vicinity of the image forming apparatus that has transmitted the imaging request based on the imaging request received by the receiving unit;
   a second transmission unit configured to, via the network transmit user information that corresponds to the image imaged by the imaging unit to the image forming apparatus as a response to the imaging request,
   wherein the image forming apparatus further comprises:
   a performing unit configured to perform login processing using the user information transmitted from the network camera.

2. The system according to claim 1, wherein, based on the imaging request, the imaging unit images at least a face of a person in a vicinity of the image forming apparatus.

3. The system according to claim 1, wherein the detection unit is a sensor for detecting a user of the image forming apparatus.

4. The system according to claim 1,
   wherein a power control unit is further configured to shift the image forming apparatus to a first power state from a second power state in which power consumption is lower than power consumption in the first power state, and
   wherein, based on the detection result of the detection unit, the power control unit shifts the image forming apparatus to the first power state from the second power state and the first transmission unit transmits the imaging request.

5. The system according to claim 1, wherein the network camera further comprises an authentication unit configured to perform authentication based on the image imaged by the imaging unit, or a third transmission unit configured to transmit the image imaged by the imaging unit to an authentication server.

6. An image forming apparatus that is able to communicate with a network camera, attached to a position away from the image forming apparatus, via a network, the image forming apparatus comprising:
- a detection unit configured to detect a user in a vicinity of the image forming apparatus and output a user detection signal based on a detection result;
- a first transmission unit configured to, based on the user detection signal, transmit an imaging request to the network camera via the network; and
- a performing unit configured to receive from the network camera user information that corresponds to an image imaged by the network camera in response to the imaging request and perform login processing using the received user information.

7. The image forming apparatus according to claim 6, wherein the detection unit is a sensor for detecting a user of the image forming apparatus.

8. A network camera that is able to communicate with an image forming apparatus, attached to a position away from the network camera, via a network, the network camera comprising:
- a receiving unit configured to receive a imaging request transmitted from the image forming apparatus via the network;
- an imaging unit configured to image and zooms in on the image forming apparatus and a vicinity of the image forming apparatus that has transmitted the imaging request based on the imaging request received by the receiving unit;
- a second transmission unit configured to, via the network transmit user information that corresponds to the image imaged by the imaging unit to the image forming apparatus as a response to the imaging request.

9. The network camera according to claim 8, wherein, based on the imaging request, the imaging unit images at least a face of a person in a vicinity of the image forming apparatus.

10. A method for controlling operation between an image forming apparatus and a network camera that is attached to a position away from the image forming apparatus and able to communicate with the image forming apparatus via a network, the method comprising:
- detecting a user in a vicinity of the image forming apparatus and output a user detection signal based on a detection result;
- transmitting, based on the user detection signal, an imaging request to the network camera;
- receiving the transmitted imaging request;
- imaging and zooming in on the image forming apparatus and the vicinity of the image forming apparatus that has transmitted the imaging request based on the received imaging request;
- transmitting user information that corresponds to the image imaged by the imaging to the image forming apparatus as a response to the imaging request; and
- performing login processing using the user information transmitted from the network camera.

11. The system according to claim 1, wherein the image forming apparatus further comprises a printer which prints an image on a media.

12. The image forming apparatus according to claim 6, further comprising a printer which prints an image on a media.

* * * * *